US008438027B2

(12) United States Patent
Teranishi et al.

(10) Patent No.: US 8,438,027 B2
(45) Date of Patent: May 7, 2013

(54) UPDATING STANDARD PATTERNS OF WORDS IN A VOICE RECOGNITION DICTIONARY

(75) Inventors: Toshiyuki Teranishi, Kanagawa (JP); Kouji Hatano, Tokyo (JP)

(73) Assignee: Panasonic Corporation, Osaka (JP)

( * ) Notice: Subject to any disclaimer, the term of this patent is extended or adjusted under 35 U.S.C. 154(b) by 1373 days.

(21) Appl. No.: 11/915,613

(22) PCT Filed: May 25, 2006

(86) PCT No.: PCT/JP2006/310490
§ 371 (c)(1),
(2), (4) Date: Nov. 27, 2007

(87) PCT Pub. No.: WO2006/126649
PCT Pub. Date: Nov. 30, 2006

(65) Prior Publication Data
US 2009/0106027 A1    Apr. 23, 2009

(30) Foreign Application Priority Data
May 27, 2005    (JP) ................................. 2005-156205

(51) Int. Cl.
*G10L 15/06* (2006.01)
*G10L 15/04* (2006.01)
(52) U.S. Cl.
USPC ............................ 704/243; 704/244; 704/254
(58) Field of Classification Search ........................ None
See application file for complete search history.

(56) References Cited

U.S. PATENT DOCUMENTS

| | | | |
|---|---|---|---|
| 4,819,271 A * | 4/1989 | Bahl et al. ..................... | 704/256 |
| 5,199,077 A | 3/1993 | Wilcox et al. | |
| 5,390,278 A * | 2/1995 | Gupta et al. .................. | 704/243 |
| 5,712,957 A * | 1/1998 | Waibel et al. ................. | 704/240 |
| 6,385,579 B1 * | 5/2002 | Padmanabhan et al. ...... | 704/243 |
| 6,473,734 B1 * | 10/2002 | Dvorak ......................... | 704/235 |

(Continued)

FOREIGN PATENT DOCUMENTS

| | | |
|---|---|---|
| EP | 0 533 491 A2 | 9/1992 |
| JP | 05-188988 | 7/1993 |

(Continued)

OTHER PUBLICATIONS

International Search Report Dated Jun. 20, 2006.

(Continued)

*Primary Examiner* — Jesse Pullias
(74) *Attorney, Agent, or Firm* — Pearne & Gordon LLP

(57) ABSTRACT

An object of the invention is to conveniently increase standard patterns registered in a voice recognition device to efficiently extend the amount of words that can be voice-recognized. New standard patterns are generated by modifying a part of an existing standard pattern. A pattern matching unit 16 of a modifying-part specifying unit 14 performs pattern matching process to specify a part to be modified in the existing standard pattern of a usage source. A standard pattern generating unit 18 generates the new standard patterns by cutting or deleting voice data of the modifying part of the usage-source standard pattern, substituting the voice data of the modifying part of the usage-source standard pattern for another voice data, or combining the voice data of the modifying part of the usage-source standard pattern with another voice data. A standard pattern database update unit 20 adds the new standard patterns to a standard pattern database 24.

17 Claims, 12 Drawing Sheets

U.S. PATENT DOCUMENTS

| | | | |
|---|---|---|---|
| 7,120,582 B1 * | 10/2006 | Young et al. | 704/255 |
| 7,228,276 B2 * | 6/2007 | Omote et al. | 704/243 |

FOREIGN PATENT DOCUMENTS

| | | | |
|---|---|---|---|
| JP | 05-204394 A | 8/1993 | |
| JP | 06-161704 A | 6/1994 | |
| JP | 09-026799 A | 1/1997 | |
| JP | 11-190997 | 7/1999 | |
| JP | 11-202886 A | 7/1999 | |
| JP | 2000-276184 | 10/2000 | |
| JP | 2001-324995 | 11/2001 | |
| JP | 2003-188948 | 4/2003 | |
| JP | 3434838 | 5/2003 | |
| JP | 2004-153306 | 5/2004 | |

OTHER PUBLICATIONS

Larson et al; "Compund splitting and lexical unit recombination for improved performance of a speech recognition ststem for German parliamentary speeches", International Conference on Speech and Language Processing , vol. 3, Oct. 16, 2000 pp. 945-948.

Singh et al; "Structured Redefinition of Sound Units by Merging and Splitting for Improved Speech Recognition", International Conference on Speech and Language Processing, vol. 3, Oct. 16, 2000 pp. 151-154.

European Search Report, dated May 7, 2009.

* cited by examiner

⟨USAGE-SOURCE VOICE⟩

⟨USAGE-SOURCE VOICE⟩ ⟨VOICE FOR SPECIFYING MODIFYING PART⟩

⟨VOICE OF NEW STANDARD PATTERN⟩ ⟨VOICE FOR UPDATE⟩ ⟨GROUP OF STANDARD PATTERNS PRIOR TO UPDATE⟩

⟨GROUP OF STANDARD PATTERNS AFTER ADDITION⟩

FIG. 8 (a)

⟨USAGE-SOURCE VOICE⟩
| M | E | I | R | U | J | Y | U | S | H | I | N | J | I | N | O | H | Y | O | U | J | I | S | E | T | T | E | I | W | O | H | E | N | K | O | U | S | H | I | M | A | S | U |

+

⟨VOICE OF MODIFYING PART⟩
| M | E | I | R | U | J | Y | U | S | H | I | N | J | I | N | O |

FIG. 8 (b)

⟨USAGE-SOURCE VOICE⟩
| M | E | I | R | U | J | Y | U | S | H | I | N | J | I | N | O | H | Y | O | U | J | I | S | E | T | T | E | I | W | O | H | E | N | K | O | U | S | H | I | M | A | S | U |

⟨VOICE OF NEW STANDARD PATTERN⟩
| H | Y | O | U | J | I | S | E | T | T | E | I | W | O | H | E | N | K | O | U | S | H | I | M | A | S | U |

FIG. 8 (c)

⟨GROUP OF STANDARD PATTERNS PRIOR TO UPDATE⟩
| M | E | I | R | U | · | · | · | H | Y | O | U | J | I | S | E | T | T | E | I | · | · | · |
| M | E | I | R | U | · | · | · | O | T | O | S | E | T | T | E | I | · | · | · |
| M | E | I | R | U | · | · | · | F | U | R | I | W | A | K | E | · | · | · |

⟨GROUP OF STANDARD PATTERNS AFTER UPDATE⟩
| H | Y | O | U | J | I | S | E | T | T | E | I | W | O | H | E | N | K | O | U | S | H | I | M | A | S | U |
| M | E | I | R | U | · | · | · | O | T | O | S | E | T | T | E | I | · | · · |
| M | E | I | R | U | · | · | · | F | U | R | I | W | A | K | E | · | · · |

UPDATING STANDARD PATTERNS OF WORDS IN A VOICE RECOGNITION DICTIONARY

TECHNICAL FIELD

The present invention relates to a voice edition device, voice edition method, and voice edition program.

BACKGROUND ART

In general, when editing recorded voice data, an editor specifies and cuts editing points while listening to a voice that is played back.

In Patent Document 5, when generating a voice card (which is generated by recording voice on a card and attaching photos on the card), an editor represents the voice on an editing window on a screen of a computer with an advanced voice edition program, and uses a tool, such as mouse, to delete, cut or combine part of the voice.

In addition, a voice recognition device uses a voice standard pattern (hereinafter referred to as 'standard pattern') as a voice recognition dictionary to recognize the voice. However, the standard pattern needs to be extended to increase the number of words that can be voice-recognized. In this case, part of an existing standard pattern may be deleted or cut to generate the standard pattern.

Edition of a standard pattern as a voice recognition dictionary in a voice recognition device will be described.

The voice recognition device divides the target voice into predetermined time intervals (frames), extracts a multi-dimensional feature parameter (cepstrum) indicating the feature of a voice waveform of each of the frames, compares a time series pattern of the feature parameter with a standard pattern (a time series pattern of a feature parameter of words that are a basic unit in voice recognition) that is accumulated in the voice recognition device, determines a similarity therebetween, and outputs words with a highest similarity as recognition results.

Cepstrum (feature parameter) is obtained by dividing a voice signal by a time frame of about 20 to 40 msec, which uses the fast Fourier transform (FFT) of the voice signal corresponding to the time frame, obtains the log of the amplitude spectrum, and uses the inverse discrete Fourier transform (IDFT) of frequency spectrum of the log.

A frequency spectrum of the voice obtained by the FFT includes approximate configuration information of the voice (envelope information indicating a phonological property) and information of a minute oscillation component (minute structure information indicating the pitch of the sound). In a case of voice recognition, it is important to extract the phoneme of the voice (that is, to estimate the sound of the voice) but the minute structure information is not as important. Accordingly, the envelope information and the minute structure information are divided from each other by using the IDFT of the frequency spectrum of the log.

When using the IDFT, the envelope information is concentrated on the left side of quefrency axis (horizontal axis), while the minute structure information is concentrated on the right side of the quefrency axis. Accordingly, the envelope information and the minute structure information can be efficiently divided from each other. This is the cepstrum. For voice analysis, LPC (Linear Predictive Coding) may be used instead of FFT.

Mel implies that the quefrency axis is converted to a logarithmic function according to the human auditory performance.

In the invention, 'cepstrum' includes 'Mel-cepstrum', which is mainly represented as a 'feature parameter'. 'Cepstrum' or 'feature parameter' may be represented as 'voice data.' The 'voice data' of a super ordinate concept includes 'voice converted into text' and 'voice data (waveform data)' in addition to the feature parameter (cepstrum) of the voice.

The voice recognition device has a plurality of standard patterns (that is, cepstrum for each word that is a recognition unit: feature parameter indicating the features of the sound of the word) as a recognition dictionary. The voice recognition device needs to have a number of standard patterns to increase the number of words that can be recognized.

Patent Document 1 discloses a method of generating new standard patterns used for voice recognition by inputting text of words and automatically generating standard patterns of the words.

Patent Document 2 proposes that a phoneme dictionary be used instead of the standard pattern. Patent Document 2 discloses a voice recognition technique in which in order to generate a recognition word dictionary for unspecified individuals, a feature parameter of a word pronounced by a small number of people is compared with an ordinary standard pattern generated based on voice of a large number of people such that a phoneme dictionary is generated from the comparison results and is used for voice recognition.

Patent Document 3 discloses a technique of recognizing voice to control the operation of a mobile terminal (mobile terminal, etc.) equipped with a voice recognition device.

Patent Document 4 discloses a technique of automatically converting input voice to text data in a mobile terminal (mobile terminal, PDA, etc.) equipped with a voice recognition device and a text conversion device.

Since the mobile terminal is required to be compact and inexpensive, it is practical that the mobile terminal is equipped with a relatively inexpensive voice recognition device having a simple recognition dictionary (standard pattern). In this case, a user updates the recognition dictionary of the mobile terminal according to his/her situation (that is, the user customizes the recognition dictionary).

When the user customizes the recognition dictionary mounted in the mobile terminal, if the procedure or manipulation thereof is complicated, inconvenience is caused to the user of the mobile terminal. Therefore, a technique that does not make it hard for the user to use and allows the user to easily extend the recognition dictionary (standard pattern) is required. Further, for example, when part of a large amount of voice data is edited, since an operation of inputting a large amount of voice data from its beginning produces very low efficiency, a technique of conveniently editing the voice data is required.

Patent Document 1: JP-A-11-190997
Patent Document 2: JP-A-5-188988
Patent Document 3: JP-A-2004-153306
Patent Document 4: JP-A-2003-188948
Patent Document 5: JP-A-2000-276184

DISCLOSURE OF THE INVENTION

Problem that the Invention is to Solve

In the method of generating standard patterns (voice data) described in Patent Document 1, all words registered as the standard patterns need to be input in text form, which is inconvenient. In particular, it is very difficult to input text in the mobile terminal because the input keys are small.

In the method of generating standard patterns (voice data) described in Patent Document 2, words to be added should be accurately pronounced. Accordingly, it is not easy to accurately pronounce a large amount of words.

In the voice edition method described in Patent Document 5, an advanced voice edition program is used to edit the voice data. However, a mobile terminal equipped with the advanced voice edition program is expensive. Further, the operation of editing voice data by the advanced voice edition program requires complex operation of a mouse, which takes a long time.

The invention provides a technique of editing voice data on a mobile terminal conveniently and inexpensively. The invention further provides a voice recognition device, a standard pattern generating method, and a standard pattern generating program that can efficiently increase the number of words that can be voice-recognized by increasing standard patterns registered in the voice recognition device.

Means for Solving the Problem

According to an aspect of the invention, there is provided a voice edition device that uses existing voice data to generate another voice data, including: a modifying-part specifying unit that performs a matching process between usage-source voice data among the existing voice data and modifying-part voice data for specifying a modifying part of the usage-source voice data and specifies at least a part of the usage-source voice data as the modifying part; and a voice data generating unit that uses the modifying-part voice data specified by the modifying-part specifying unit to generate another voice data.

The voice data generating unit may generate, as another voice data, in which voice data is obtained by substituting the modifying-part voice data of the usage-source voice data specified by the modifying-part specifying unit with different voice data.

The voice data generating unit may generate, as another voice data, in which voice data is obtained by combining the modifying-part voice data specified by the modifying-part specifying unit with different voice data.

As a result, new voice data is generated by editing existing voice data, it is simple to edit the voice data by automatically specifying the modifying part using the pattern matching process (that is, voice recognition function of the voice recognition device is also used to edit the voice data). That is, it is easy to cut or combine the voice by inserting a part of the voice to an existing voice. For example, if the existing voice data, "WATASHI WA NISEN GO NEN SHIGATSU TSUITACHI NI EI SHA NI NYUSHA SHIMASHITA" (that means 'I entered the 'A' company on Apr. 1, 2005'), is stored in a mobile terminal. A method of editing the existing voice data is as follows. First, when a sentence 'please pronounce a part to be cut' is displayed on a display unit of the mobile terminal, a user pronounces "NISEN GO NEN SHIGATSU TSUITACHI NI" (that means 'on Apr. 1, 2005.') The user's voice is input to the mobile terminal. Then, a pattern matching process is performed between the existing voice data and the new input voice, and a matched part is cut. As a result, voice "WATASHI WA EI SHA NI NYUSHA SHIMASHITA" (that means 'I entered the 'A' company') is obtained. In addition, the invention can be used to divide the existing voice data into a plurality of sentences. For example, it is assumed that voice data "JUJI KARA KAIGI DESU BASHO WA DAIICHI KAIGISHITSU DESU" (that means 'the meeting will take place at 10 o'clock in the first conference room') is stored in a mobile terminal. When a sentence 'please pronounce part of the voice to be divided' is displayed on a display unit of the mobile terminal, the user pronounces "BASHO WA" (that means) 'in.' Then, the voice "BASHO WA" (that means 'in') is input to the mobile terminal, and is compared with the existing voice data by performing pattern matching therebetween. As a result, the existing voice data "JUJI KARA KAIGI DESU BASHO WA DAIICHI KAIGI SHITSU DESU" (that means 'the meeting will take place at 10 o'clock in the first conference room') is divided into two voice data, that is, "JUJI KARA KAIGI DESU" (that means 'the meeting will take place at 10 o'clock' and "BASHO WA DAIICHI KAIGI SHITSU DESU" (that means 'in the first conference room.') Therefore, according to an embodiment of the invention, it is possible to conveniently edit the voice data using the mobile terminal. As a result, it is possible to generate various voice data efficiently and inexpensively.

The different voice data used to generate another voice data in the voice edition device may include voice data that is input to the voice edition device from the outside, voice data that is cut from the existing voice data, or the existing voice data.

Accordingly, because various voice data is used to edit the voice data, it is possible to efficiently generate new voice data.

According to another aspect of the invention, there is provided a voice recognition device that uses an existing standard pattern to generate another standard pattern by means of the voice edition device according to an embodiment of the invention, including: a modifying-part specifying unit that performs a matching process between a usage-source standard pattern among the existing standard pattern and modifying-part voice data for specifying a modifying part of the usage-source standard pattern and specifies at least a part of the usage-source standard pattern as the modifying part; and a voice data generating unit that uses the modifying-part voice data specified by the modifying-part specifying unit to generate another standard pattern.

Since a new standard pattern is generated using an existing standard pattern, it is possible to efficiently generate a useful standard pattern by automatically specifying the modifying part using the pattern matching process (that is, voice recognition function of the voice recognition device is also used to generate the standard pattern). When the mobile terminal is equipped with the voice recognition device and the operation of the mobile terminal is controlled through voice recognition, a group of words having typical voice patterns may be required. For example, suppose that a mobile terminal is automatically turned off by recognizing broadcasted announcements in public areas, such as a cinema, a hospital, a station, and a building. The mobile terminal is first configured to recognize announcement in a cinema that announces 'please turn off your mobile terminal in the cinema' (that is, a standard pattern of words 'please turn off your mobile terminal in the cinema' is registered in a voice recognition dictionary of the mobile terminal in advance). Then, the part 'in the cinema' in the standard pattern can be substituted with voice data 'in the hospital', 'in the station' or 'in the building', such that the standard pattern can be efficiently used to turn off the mobile terminal in different areas. In addition, when the part 'in the cinema' of the usage-source standard pattern is modified, the part can be simply automatically specified using the matching process of voice recognition. For example, it is possible to easily specify part of the usage-source standard pattern to be modified by inputting the voice 'in the cinema' through the microphone of the mobile terminal, performing matching process with the usage-source standard pattern (standard pattern of the sentence 'please turn off your mobile terminal in the cinema'), and setting a matched part (that is, the part 'in the cinema') as a modifying part. It is possible to efficiently generate a plurality of new standard patterns used to automatically turn-off control by updating the voice data (e.g., by substituting the voice data 'in the cinema' with the voice data 'in the hospital', 'in the station' or 'in the building').

The voice recognition device may further include a standard pattern database update unit that updates a standard pattern database by substituting the other standard pattern generated by the voice data generating unit as the usage-source standard pattern, or by adding the other standard pattern as a standard pattern that is different from the usage-source standard pattern.

The new standard pattern is substituted as the usage-source standard pattern (in this case, the usage-source standard pattern is deleted), or is added to the voice recognition dictionary (standard pattern database) as a standard pattern that is different from the usage-source standard pattern (in this case, the usage-source standard pattern and the new standard pattern exist together), thereby updating the standard pattern database.

In the voice recognition device according to an embodiment of the invention, the modifying-part specifying unit may perform a matching process between voice data for extracting the usage-source standard pattern and voice data having a plurality of existing standard patterns, and extract, as the usage-source standard pattern, the existing standard pattern containing a matched part between the voice data for extracting the usage-source standard pattern and the voice data having a plurality of existing standard patterns.

That is, the matching process is also performed when the usage-source standard pattern is used. Accordingly, it is possible to rapidly extract and specify a target usage-source standard pattern by using the voice recognition function of the voice recognition device to select the usage-source standard pattern.

According to another aspect of the invention, there is provided an electronic apparatus equipped with the voice edition device or the voice recognition device according to an embodiment of the invention.

The voice edition device or voice recognition device according to an embodiment of the invention can efficiently increase the number of new voice data (including standard patterns) by editing the existing standard patterns, and can rapidly extend voice data or words of the voice recognition dictionary. Accordingly, a user can efficiently customize voice data (including standard patterns) in the electronic apparatus.

According to another aspect of the invention, there is provided a mobile terminal equipped with the voice edition device or voice recognition device according to an embodiment of the invention.

Since the voice edition device or voice recognition device according to an embodiment of the invention makes the most of the existing functions or voice data, it is compact and inexpensive, and can be incorporated in the mobile terminal. In addition, since the user can easily customize the voice data, the user can conveniently use the voice edition function (including function of editing the standard patterns) according to his/her situation. Accordingly, the mobile terminal can have various functions.

According to another aspect of the invention, there is provided a voice edition method that uses existing voice data to generate another voice data, including: performing a matching process between usage-source voice data and modifying-part voice data for specifying a modifying part of the usage-source voice data and specifying at least a part of the usage-source voice data as the modifying part; and using the specified modifying-part voice data to generate another voice data.

According to another aspect of the invention, there is provided a voice recognition method that uses an existing standard pattern to generate another standard pattern, including: performing a matching process between a usage-source standard pattern and modifying-part voice data for specifying a modifying part of the usage-source standard pattern and specifying at least a part of the usage-source standard pattern as the modifying part; and using the specified modifying-part voice data to generate another standard pattern.

Accordingly, it is possible to efficiently extend new useful voice data (standard patterns) easily.

According to another aspect of the invention, there is provided a voice edition program to execute on a computer the voice edition method according to an embodiment of the invention.

According to another aspect of the invention, there is provided a voice recognition program to execute on a computer the voice recognition method according to an embodiment of the invention.

Accordingly, it is possible to edit the voice data (including standard patterns) conveniently and inexpensively in various electronic apparatuses.

Effects of the Invention

Since the voice edition device generates new voice data (including standard patterns as a voice recognition dictionary) by editing existing voice data, it is possible to easily edit the voice data by automatically specifying a modifying part using the pattern matching process, that is, by using the voice recognition function of the voice recognition device to edit the voice data.

That is, it is possible to simply edit the voice data, that is, it is possible to simply cut or combine the voice data, because the voice data is partially input to the existing voice.

Accordingly, it is possible to simply edit the voice data using the mobile terminal, such that various voice data can be generated efficiently and inexpensively. For example, when a part of the voice data stored in the mobile terminal is modified, it is possible to edit the voice data by specifying the modifying part and substituting it with another voice data.

In detail, it is possible to efficiently generate various standard patterns from the existing standard patterns by using the voice edition device, voice edition method, and voice edition program as the voice recognition device, standard pattern generating method, and standard pattern generating program. In addition, it is possible to efficiently generate useful standard patterns by automatically specifying the modifying part through the pattern matching process, that is, by using the voice recognition function of the voice recognition device to generate the standard patterns. Accordingly, it is possible to easily and rapidly extend the amount of words that can be voice-recognized.

When the operation of the mobile terminal is controlled through voice recognition, or e-mail is efficiently generated by converting an input voice signal to text data, it is important to recognize the different voice part. Accordingly, the method of generating new standard patterns by modifying part of the existing standard pattern according to an embodiment of the invention is very efficient.

In addition, it is possible to simply specify a modifying part in the existing standard pattern through the pattern matching process. That is, since the matching process function of the voice recognition device is also used to generate the standard pattern in the invention, it is possible to reduce the number of hardware required. Accordingly, it is possible to reduce the cost.

In addition, the update voice data for updating the existing standard pattern base of the usage source may include the voice data of the voice input by the user, the voice data obtained by cutting the existing standard pattern, or the voice data of the existing standard pattern. Since various kinds of voice data can be used, new standard patterns can be efficiently generated.

In addition, since the voice edition device (including voice recognition device) can easily customize the voice data, which is compact and inexpensive, as such, the voice edition device can be easily included with the electronic apparatus.

In addition, according to the voice edition method (including the standard pattern generating method) according to an embodiment of the invention, it is possible to efficiently extend new useful voice data (standard patterns) easily.

Furthermore, according to the voice edition program according to an embodiment of the invention, it is possible to edit the voice data (including standard patterns) conveniently and inexpensively.

BRIEF DESCRIPTION OF THE DRAWINGS

FIGS. 8(a) to (d) are views illustrating signal processing upon generating a standard pattern according to the sequence shown in FIG. 7.

DESCRIPTION OF REFERENCE NUMERALS AND SIGNS

Figure 1:
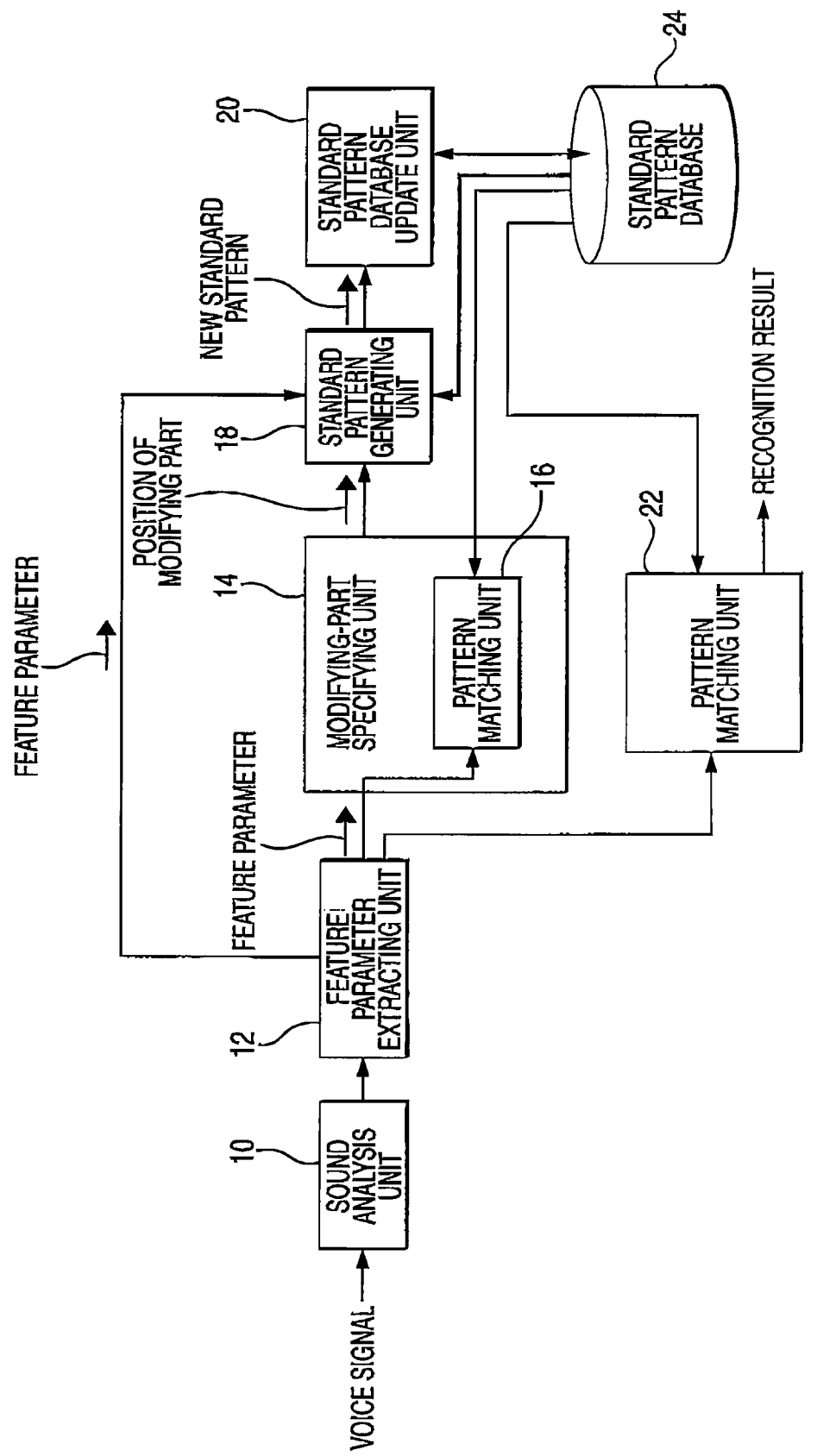
FIG. 1 is a block diagram of a voice recognition device (which uses a voice edition device for voice recognition) according to an embodiment of the invention.

10: sound analysis unit
12: feature parameter extracting unit
14: Modifying-part specifying unit
16: pattern matching unit for performing matching process of specifying modifying part
18: standard pattern generating unit
20: standard pattern database update unit
22: pattern matching unit for performing pattern matching process of voice recognition
24: standard pattern database (voice recognition dictionary file)
26: control unit
28: display interface
30: display unit
32: usage-source standard pattern extracting unit
34: pattern matching unit for performing matching process for extracting usage-source standard pattern
550: mobile terminal
700: wireless unit
701: voice codec
702: digital signal processor
703: converter
704: speaker
705: microphone
706: controller
707: voice recorder
708: sound analysis unit
709: feature parameter extracting unit
710: modifying-part specifying unit
711: pattern matching unit for performing matching process of recognizing voice and specifying usage-source standard pattern
712: standard pattern generating unit
713: standard pattern database update unit
714: standard pattern database (voice recognition dictionary file)
715: media interface
717: text converter
1000: mobile terminal
1002: upper package
1004: lower package
1006: display unit
1008: operation key
1010: insertion hole
1012: recording media
AN: antenna

BEST MODE FOR CARRYING OUT THE INVENTION

Exemplary embodiments according to the invention will be described with reference to the accompanying drawings.

The invention relates to a voice edition device and a voice edition method, which can edit and process a voice, and be used in other applications.

For instance, it is possible to efficiently extend standard patterns as a voice recognition dictionary by using the voice edition device according to the invention as a voice recognition device.

First to fourth embodiments describe the voice edition device that is used as a voice recognition device to extend standard patterns. A fifth embodiment describes the voice edition device that is used to edit and process voice, in addition to the use of the voice edition device for voice recognition.

(First Embodiment)

FIG. 1 is a block diagram of a voice recognition device (which uses the voice edition device according to the invention for voice recognition) according to an embodiment of the invention.

The voice recognition device includes a sound analysis unit 10, a feature parameter extracting unit 12, a modifying-part specifying unit 14 (including a pattern matching unit 16 used to specify a modifying part), a standard pattern generating unit 18, a standard pattern database update unit 20, a pattern matching unit (voice recognition unit of the voice recognition device for voice recognition) 22, and a standard pattern database (voice recognition dictionary file) 24. The type of data stored in the standard pattern database 24 may be 'feature parameter (cepstrum)', 'voice converted to text form (dictionary data as a character string)', or 'voice data (waveform data)'. In the following description, it is assumed that the 'feature parameter (cepstrum)' is stored as a standard pattern in the standard pattern database 24.

In FIG. 1, the pattern matching unit 16 in the modifying-part specifying unit 14, and the pattern matching unit (voice recognition unit) 22 that performs voice recognition function of the voice recognition device are independently described. However, the invention is not limited thereto, and a common pattern matching unit may be used in the first to fifth embodiments.

Figure 2:
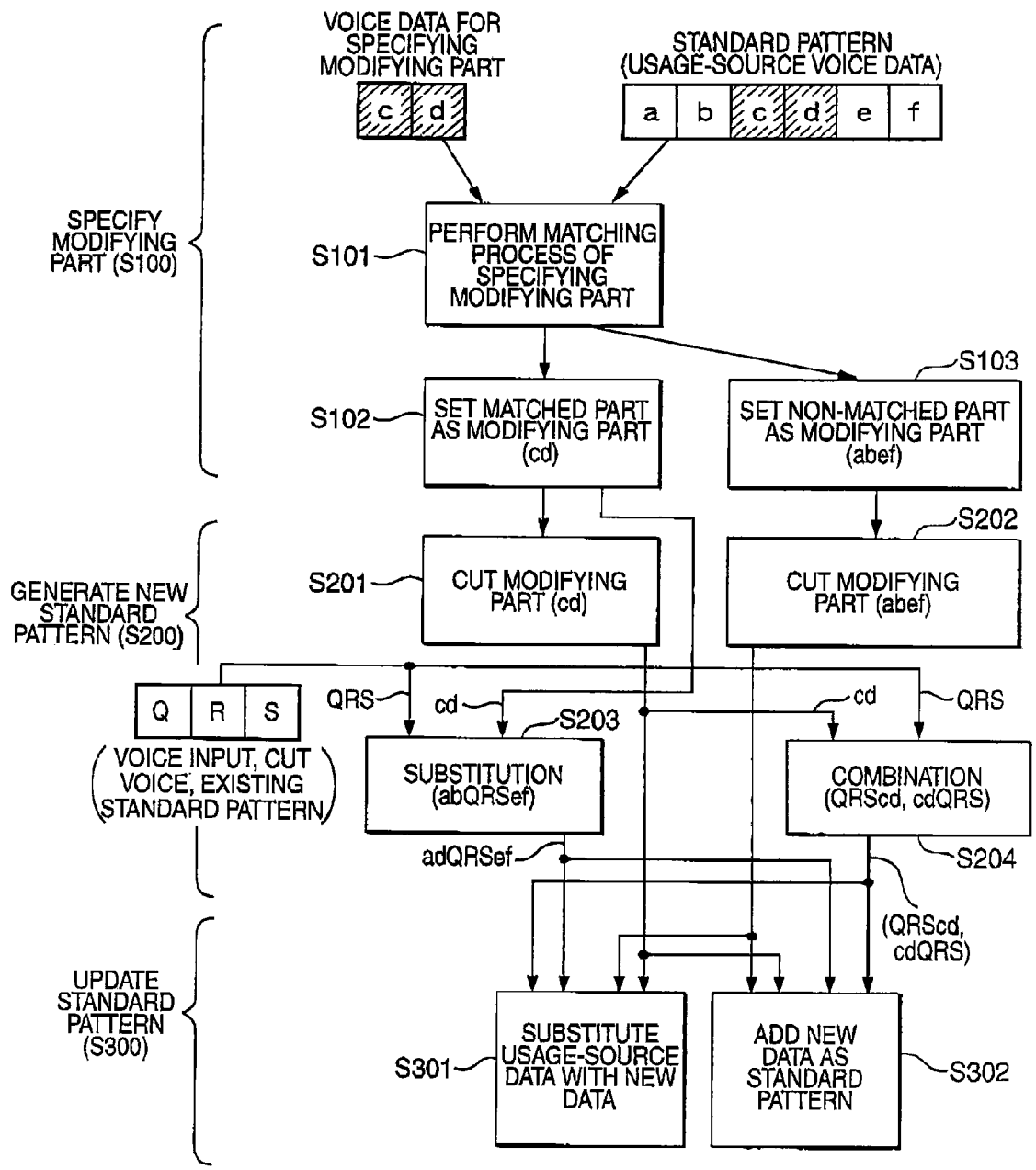
FIG. 2 is flow chart showing the operation of generating a new standard pattern from an existing standard pattern and updating a standard pattern database in the voice recognition device shown in FIG. 1.

The sound analysis unit 10 in FIG. 2 divides an input voice signal by a time frame of about 20-40 msec and uses the fast Fourier transform (FFT) of a voice signal corresponding to the time frame.

The feature parameter extracting unit 12 obtains the log of the absolute value of sound analysis result (that is, the amplitude of frequency spectrum), uses the inverse discrete Fourier transform (IDFT) of the log, and obtains Mel-cepstrum (feature parameter). The feature parameter is sent to the modifying-part specifying unit 14 and the standard pattern generating unit 18.

The modifying-part specifying unit 14 extracts from the standard pattern database 24 a feature parameter of an existing standard pattern that becomes a usage source. The pattern matching unit 16 performs matching process between a feature parameter of voice data for specifying a modifying part (e.g., a user uses a microphone to input voice) and a feature parameter of an existing standard pattern of a usage source, and specifies a matched part or non-matched part as a modifying part. A modifying-part position signal that indicates a position of the modifying part is sent to the standard pattern generating unit 18.

The standard pattern generating unit 18 generates a new standard pattern by cutting, deleting, substituting, or combining a usage-source standard pattern. That is, at least one of the voice data obtained by cutting voice data of a modifying part of a usage-source standard pattern (that is, feature parameter of the voice of the remaining part after cutting the voice data=feature parameter of the voice obtained by cutting the voice of the modifying part), voice data that is cut, voice data obtained by substituting voice data of the modifying part for another voice data (e.g., voice data input through a microphone by a user), and voice data obtained by combining another voice data with the head or tail of the voice data that is cut is set as a new standard pattern.

The standard pattern database update unit 20 updates the standard pattern database (voice recognition dictionary file) 24. That is, the standard pattern database update unit 20 substitutes a new standard pattern for an existing standard pattern of the usage source, or adds the new standard pattern to the standard pattern database 24. When the new standard pattern is added to the standard pattern database 24, the existing standard pattern of the usage source and the new standard pattern co-exist.

FIG. 2 is a flow chart for explaining the operation of generating a new standard pattern from an existing standard pattern and updating a standard pattern database in the voice recognition device shown in FIG. 1. In FIG. 2, the time-series pattern of voice data (feature parameter of voice) is represented in alphabets for convenience of explanation.

The operation of specifying a modifying part of an existing standard pattern of a usage source is performed (Step S100).

The pattern matching unit 16 in the modifying-part specifying unit 14 performs pattern matching between voice data ('cd') for specifying a modifying part and a standard pattern ('abcdef') of the usage source (step S101). A matched part ('cd') is set as a modifying part (step S102), or a non-matched part ('abef') is set as a modifying part (Step S103).

The standard pattern generating unit 18 generates a new standard pattern (step S200).

That is, voice data is cut from the modifying part specified in step S100 (S102 and S103) (steps S201 and S202).

The cut voice data 'abef' or 'cd' can be set as a new standard pattern (S301 and S302). The voice data 'abef' is a part other than the part matched in step S101, and is obtained by deleting voice data of the matched part from the standard pattern of the usage source.

Next, substitution or combination process is performed (step S201 and S204). At step S201, the voice data 'cd' of the modifying part specified in step S102 is substituted with update voice data 'QRS'. At step S204, the update voice data 'QRS' is combined with the head or tail of the voice data 'cd' that is cut in the step S201. The update voice data 'QRS' is voice data of voice input from the microphone, voice data that is cut in S201 or S202, or voice data of the existing standard pattern.

That is, at step S203, 'abQRSef' is obtained by substituting part OO of 'abOOef' with 'QRS' (that is, 'cd' of the usage-source standard pattern is substituted with 'QRS').

At step S204, 'QRScd' or 'cdQRS' is obtained by combining 'QRS' with the head or tail of 'cd'.

'cd (data that is cut)', 'abef (data obtained by deleting voice data of the matched part)', 'abQRSef (data obtained by substitution)', 'QRScd' or 'cdQRS (data obtained by combination)' may be set as a new standard pattern.

The standard pattern database update unit 20 updates the standard pattern database 24 (step S300). The update process includes 'substitution (step S301)' and 'addition (step S302)'.

That is, in a case of 'substitution' (step S301), the existing standard pattern of the usage source is substituted with a new standard pattern. In the case of 'addition' (step S302), the new standard pattern is added to the standard pattern database 24. In this case, the existing standard pattern of the usage source and the new standard pattern exist together.

That is, according to the first embodiment of the invention, since new standard patterns are generated from existing standard patterns and the modifying part is automatically specified through the pattern matching process (voice recognition function of voice recognition device is used to generate the standard patterns), it is possible to efficiently generate useful standard patterns. Accordingly, it is possible to easily and rapidly increase the number of words that can be voice-recognized.

(Second Embodiment)

A second embodiment describes the structure and operation of a voice recognition device, and the sequence of generating a standard pattern. In this embodiment, various standard patterns are used to recognize announcement broadcast in a train or subway.

For example, a commuter commuting by train or subway may miss a station (e.g., Sibuya station) where he/she gets off the train. In this case, when he/she carries a mobile terminal equipped with a voice recognition device, the mobile terminal may recognize announcement "MAMONAKU SHIBUYA DESU" (that means 'this station is Sibuya') that is broadcast in the train or subway and activate a vibrator upon recognition of the announcement to alert the commuter, which provides convenience. Therefore, the commuter can be prevented from forgetting to get off. When he/she frequently gets off at 'Yokohama', the mobile terminal may be configured to activate the vibrator when it recognizes the announcement 'this station is Yokohama.'

When a standard pattern "MAMONAKU SHIBUYA DESU" (that means 'this station is Sibuya') is recorded on the voice recognition device, it is possible to efficiently generate necessary standard patterns by substituting 'Sibuya' with 'Yokohama' in the standard pattern.

Figure 3:
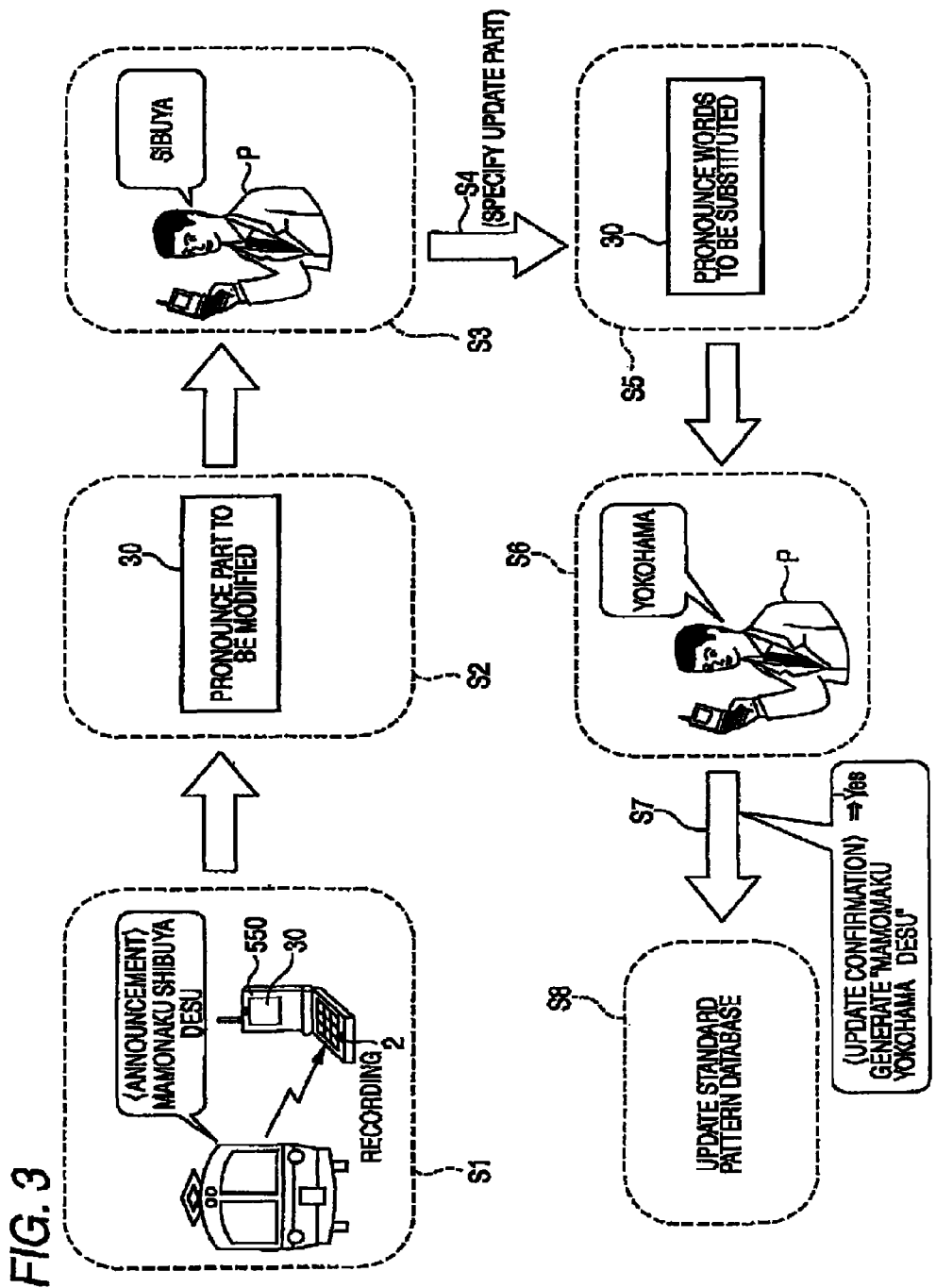
FIG. 3 is a view illustrating the sequence of generating a standard pattern by a user having a mobile terminal equipped with a voice recognition unit according to an embodiment of the invention.

FIG. 3 is a view for explaining the sequence of generating a standard pattern by a user having a mobile terminal equipped with a voice recognition unit according to an embodiment of the invention.

The user records the announcement "MAMONAKU SHIBUYA DESU" (that means 'this station is Sibuya') through the microphone 2 of the mobile terminal 550, analyzes sound of the announcement to extract a feature parameter, and registers the extracted feature parameter as a standard pattern in the mobile terminal 550 (step S1).

A message 'pronounce a part to be modified' is displayed on a display unit (LCD and the like) 30 of the mobile terminal 550 (step S2).

Next, the user P pronounces 'Sibuya', The voice 'Sibuya' is recorded on the mobile terminal 550 through the microphone 2 and is analyzed to extract a feature parameter. A matching process is performed between a usage-source standard pattern, that is, a feature parameter of the sentence "MAMONAKU SHIBUYA DESU" (that means 'this station is Sibuya') and a feature parameter of voice data 'Sibuya' for specifying a modifying part (step S4). In this case, a matched part is specified as a modifying part.

Next, a message 'pronounce a word to be substituted' is displayed on the display unit 30 of the mobile terminal 550 (step S5).

When the user P speaks 'Yokohama,' the voice 'Yokohama' is recorded on the mobile terminal 550 through the microphone 2 and is sound-analyzed to extract a feature parameter.

In order to prevent an incorrect standard pattern from being generated, a new standard pattern ('this station is Yokohama') is displayed on the display unit 30 so that the user P can confirm whether or not the new standard pattern is correct. The user P views the new standard pattern and selects 'yes' (step S7).

A standard pattern composed of the feature parameter of the sentence "MAMONAKU YOKOHAMA DESU" (that means 'this station is Yokohama') is automatically generated and the standard pattern database 24 is updated (step S8). That is, the voice data (feature parameter of 'Shibuya') of the modifying part specified in the step S4 is substituted with the feature parameter of 'Yokohama', such that a new standard pattern composed of the feature parameter of the sentence "MAMONAKU YOKOHAMA DESU" (that means 'this station is Yokohama') is generated, and the new standard pattern is added to the standard pattern database (reference numeral 24 of FIG. 1).

FIGS. 4(a) to (d) are views illustrating signal processing when generating a standard pattern according to the sequence of FIG. 3.

Figure 4:
FIGS. 4(a) to (d) are views illustrating signal processing when generating a standard pattern according to the sequence of FIG. 3.
Figure 4:
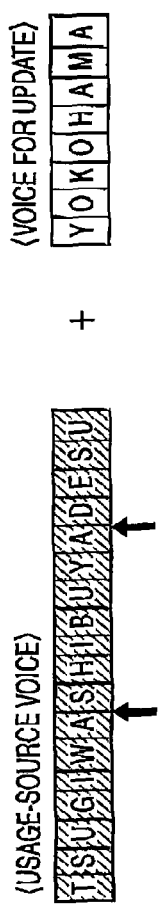
Figure 4:
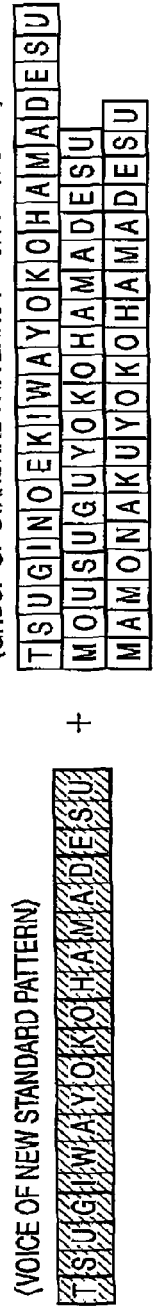
Figure 4:
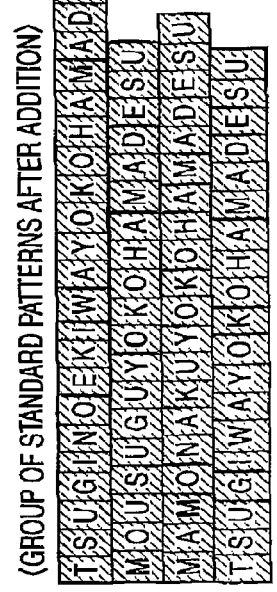

In FIG. 4(a), a pattern matching process is performed between voice data "TSUGI WA SHIBUYA DESU" (that means 'next stop is Sibuya') of a usage-source standard pattern and voice data 'Sibuya' for specifying a modifying part.

In FIG. 4(b), the part 'Sibuya' of the usage-source standard pattern is specified as a modifying part (which is specified with two thick arrows), and 'Sibuya' is substituted with 'Yokohama.'

In FIG. 4(c), the update voice "TSUGI WA YOKOHAMA DESU" (that means 'next stop is Yokohama' (that is, new standard pattern) is added to an existing group of standard patterns ("TSUGI NO EKI WA YOKOHAMA DESU" (that means 'next station is Yokohama') "MOUSUGU YOKOHAMA DESU" (that means 'the train will arrive at Yokohama before long') and "MAMONAKU YOKOHAMA DESU" (that means 'the train will arrive at Yokohama soon')) that are accumulated in the voice storage unit (reference numeral 24 of FIG. 1).

FIG. 4(d) shows an updated group of standard patterns.

Figure 5:
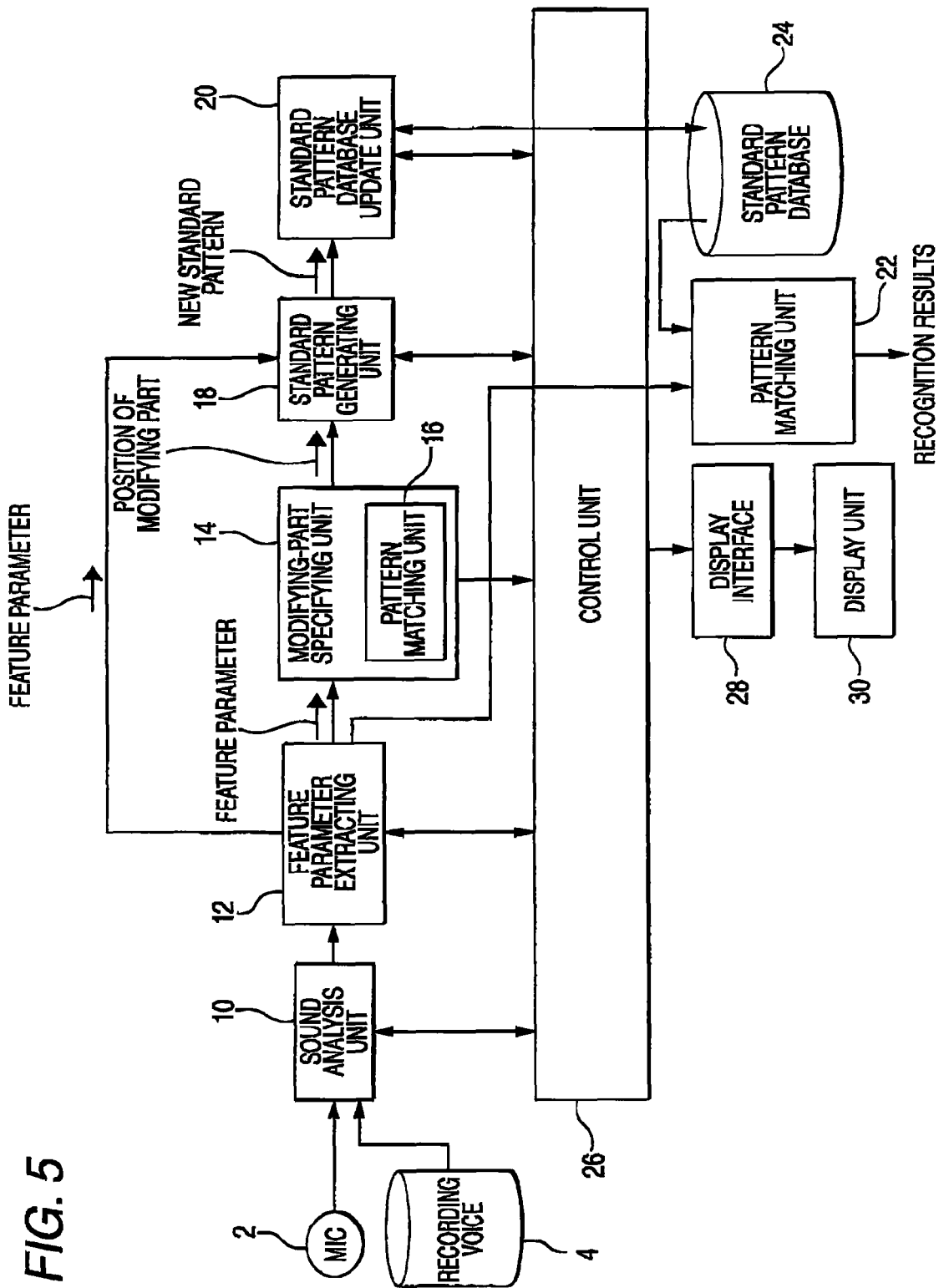
FIG. 5 is a block diagram of a voice recognition device according to an exemplary embodiment of the invention.

FIG. 5 is a block diagram of a voice recognition device according to an exemplary embodiment of the invention. Like reference numerals denote like elements in FIGS. 1 and 5.

Referring to FIG. 5, the voice recognition device further includes a microphone 2, a recorded-voice accumulation unit 4, a control unit that normally controls the operation of the voice recognition device, a display interface 28, and a display unit 30. The operation of the voice recognition device is described above with reference to FIG. 1.

Figure 6:
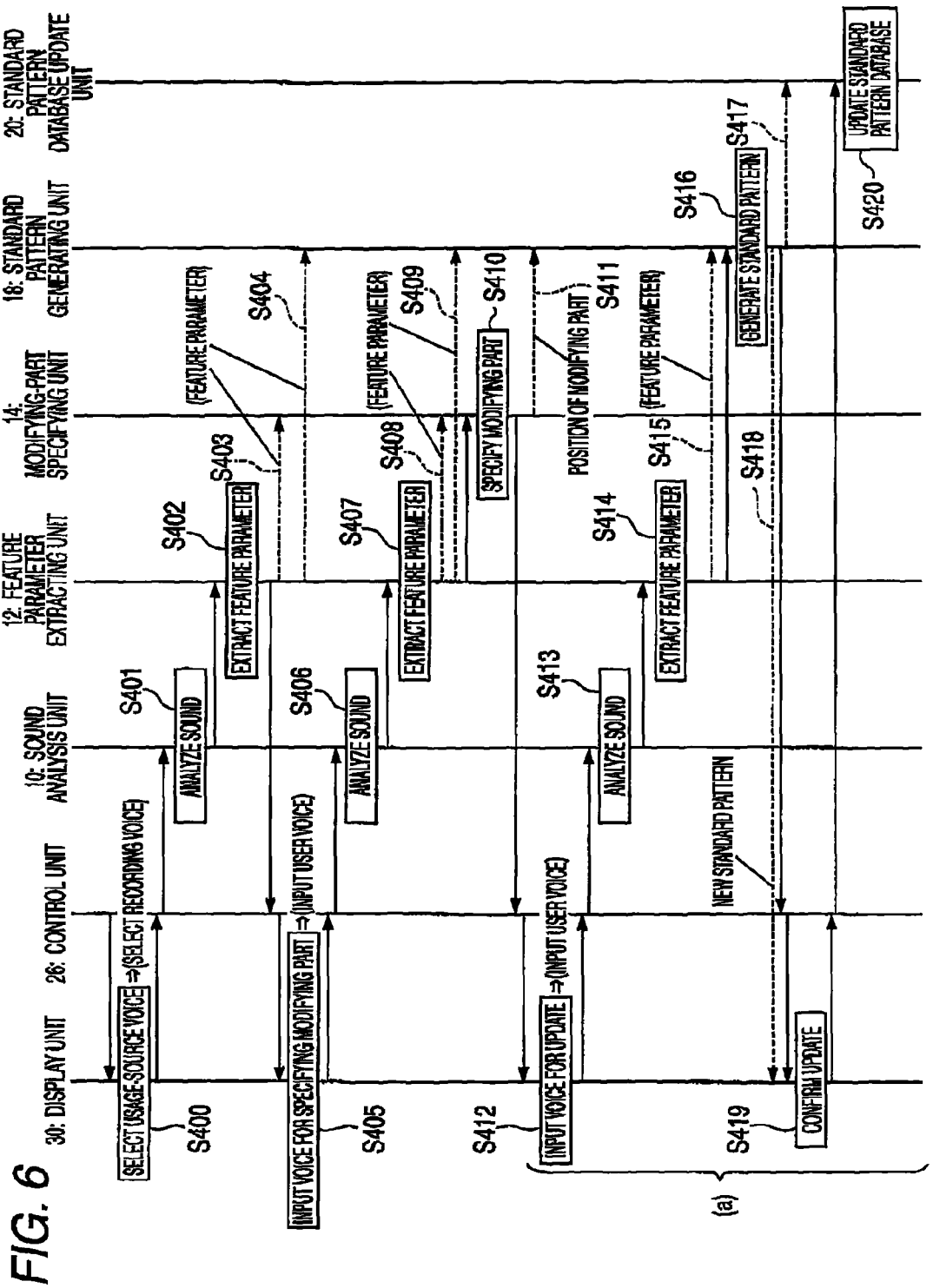
FIG. 6 is a sequence diagram showing the operation sequence of each of the elements of the voice recognition device of FIG. 5 and the sequence of data (signals) exchange.

FIG. 6 is a sequence diagram showing the operation sequence of each of the elements of the voice recognition device of FIG. 5 and the sequence of data (signals) exchange.

The control unit 26 controls such that a selection screen of the voice of the usage source is displayed on the display unit 30 so that the user can select voice data of the usage source (step S400). In this case, as described in FIG. 3, since the train announcement "MAMONAKU YOKOHAMA DESU" (that means 'the train will arrive at Sibuya soon') is already recorded and accumulated in the recorded-voice accumulation unit 4, the user selects the announcement.

Next, the sound analysis unit 10 analyzes the voice (step S401), and the feature parameter extracting unit 12 extracts a feature parameter (step S402). The extracted feature parameter is sent to the modifying-part specifying unit 14 and the standard pattern generating unit 18 (steps S403 and S404).

In addition, the control unit 26 displays on the display unit 30, a message prompting the user to input voice for specifying a modifying part (step S405). Next, a feature parameter is extracted through the sound analysis operation (step S406) and feature parameter extracting operation (step S407). The feature parameter is sent to the modifying-part specifying unit 14 and the standard pattern generating unit 18 (steps S408 and S409), and the modifying part is specified (step S410). A signal indicating position of the modifying part is sent to the standard pattern generating unit 18 (step S411).

Next, the user inputs update voice ('Yokohama') to replace the modifying part (S412). Then, a new standard pattern is generated through sound analysis operation (S413), feature parameter extracting operation (S414), and the operation of transmitting the feature parameter to the standard pattern generating unit 18 (S415) (S416).

The new standard pattern is sent to the standard pattern database update unit 20 (step S417) and the display unit 30 (S418). When the user confirms the update (step S419), the standard pattern database 24 is updated (step S420).

(Third Embodiment)

The third embodiment describes the sequence of generating a new standard pattern to control setup of a mobile terminal equipped with the voice recognition device (e.g., setup upon reception of e-mail) by the voice of a user.

A user can change screens or bell sounds displayed or ringing on a display unit of his/her mobile terminal upon reception of e-mails, and select folders for accumulation of e-mails.

In general, screens or bell sounds upon reception of e-mails are changed by operating an input key. However, since the operation key of the mobile terminal is small, it is inconvenient for the user to operate the key. Accordingly, it is convenient to change the screens or bell sounds by inputting voice rather than keys.

The term 'display setup' includes display setup of a standby screen of a phone and display setup of a game downloaded in addition to the display setup of an e-mail. In general, when the setup of mobile terminal is changed, a menu item of a super ordinate concept, 'change display setup' is changed and then a menu item of a subordinate concept, 'change display setup of e-mail reception' is selected.

When the menu item 'change display setup' is selected by voice, it is necessary to recognize a user's voice 'change display setup.' Accordingly, a standard pattern of voice of the sentence "HYOUJI SETTEI WO HENKOU SHIMASU" (that means 'change display setup') needs to be registered in advance.

It is assumed that a standard pattern "MEIRU JYUSHIN JI NO HYOUJI SETTEI WO HENKOU SHIMASU" (that means 'change display setup of e-mail reception') is registered on a mobile terminal. When the voice data of "MEIRU JYUSHIN JI NO" (that means 'of e-mail reception') is deleted, a standard pattern "HYOUJI SETTEI WO HENKOU SHIMASU" (that means 'change display setup' can be easily generated.

Figure 7:
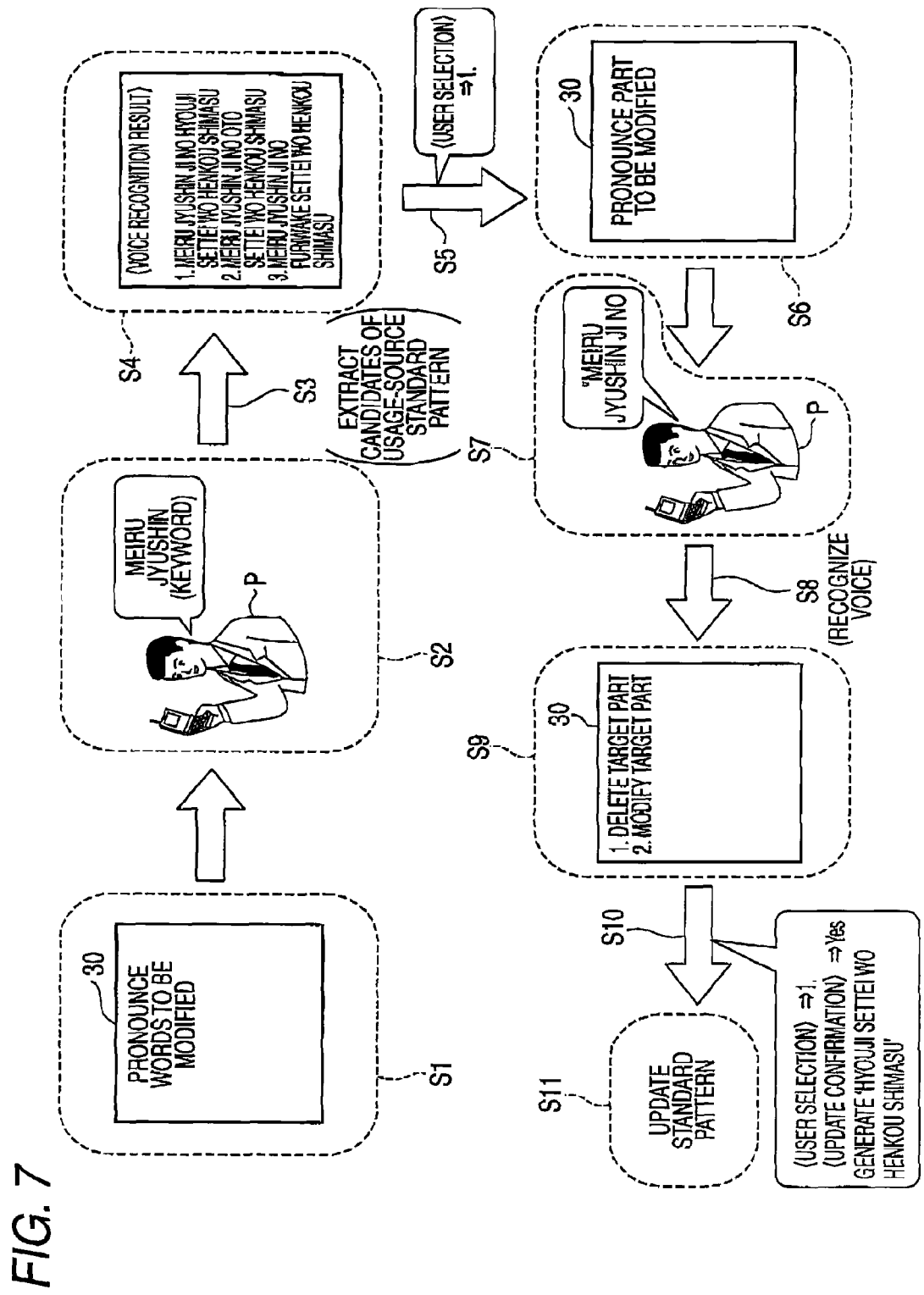
FIG. 7 is a view illustrating the sequence of selecting a standard pattern 'change display setup of e-mail reception' by voice recognition and deleting part 'of e-mail reception' from the selected standard pattern to generate a new standard pattern.

FIG. 7 is a view showing the sequence of selecting a standard pattern "MEIRU JYUSHIN JI NO HYOUJI SETTEI WO HENKOU SHIMASU" (that means 'change display setup of e-mail reception') by voice recognition and deleting the part "MEIRU JYUSHIN JI NO" (that means 'of e-mail reception') from the selected standard pattern to generate a new standard pattern.

A message 'pronounce words to be modified' is displayed on the display unit 30 of the mobile terminal 550 (step S1).

A user P pronounces "MEIRU JYUSHIN" (that means 'e-mail reception') which is a keyword for retrieving a standard pattern of a usage source (step S2).

Then, standard patterns having a part matching with "MEIRU JYUSHIN" (that means 'e-mail reception') are extracted through voice recognition. That is, words containing the keyword 'e-mail reception' ('1. "MEIRU JYUSHIN JI NO HYOUJI SETTEI WO HENKOU SHIMASU" (that means 'change display setup of e-mail reception', '2. "MEIRU JYUSHIN JI NO OTO SETTEI WO HENKOU SHIMASU" (that means 'change sound setup of e-mail reception') and '3. "MEIRU JYUSHIN JI NO FURIWAKE SETTEI WO HENKOU SHIMASU" (that means 'change distribution setup of e-mail reception')) are extracted as candidates of the usage-source standard patterns from words registered as standard patterns and are displayed on the display unit 30 (step S4).

Accordingly, when the usage-source standard patterns are selected, the usage-source standard patterns can be efficiently retrieved by using the voice recognition function of the voice recognition device.

Next, the user P selects '1. "MEIRU JYUSHIN JI NO HYOUJI SETTEI WO HENKOU SHIMASU" (that means 'change display setup of e-mail reception') (step S5).

Next, a message 'pronounce a part to be modified' is displayed on the display unit 30 of the mobile terminal 550 (step S6).

The user P pronounces "MEIRU JYUSHIN JI NO" (that means 'of e-mail reception.') The voice is recorded on the mobile terminal 550, a feature parameter is extracted through sound analysis, and a matching process is performed between "MEIRU JYUSHIN JI NO" (that means 'of e-mail recognition' and a feature parameter of the standard pattern "MEIRU JYUSHIN JI NO HYOUJI SETTEI WO HENKOU SHIMASU" (that means 'change display setup of e-mail reception') selected in the step S5, such that the part 'of e-mail reception' is specified as the modifying part (step S8).

Next, a message inquiring a method of modifying a standard pattern is displayed on the display unit 30 of the mobile terminal 550. That is, two items '1. delete the target part' and '2. modify target part' are displayed (step S9).

In this case, the user P selects '1. delete target part.' A confirmation screen is displayed on the display unit 30 to confirm whether to delete target part. When the user P selects 'Yes,' a standard pattern of words 'change display setup' is generated (step S11).

The new standard pattern is generated by deleting voice data "MEIRU JYUSHIN JI NO" (that means 'of e-mail reception') from the usage-source standard pattern. However, the process is performed by cutting voice data of the modifying part "MEIRU JYUSHIN JI NO" (that means ('of e-mail reception') from voice data "MEIRU JYUSHIN JI NO HYOUJI SETTEI WO HENKOU SHIMASU" (that means 'change display setup of e-mail reception') that is the usage-source standard pattern, and setting the remaining part "HYOUJI SETTEI WO HENKOU SHIMASU" (that means ('change display setup') as the new standard pattern.

FIGS. 8(*a*) to (*d*) are views illustrating signal processing when generating a standard pattern according to the sequence shown in FIG. 7.

In FIG. 8(*a*), the voice data "MEIRU JYUSHIN JI NO HYOUJI WO HENKOU SHI MASU" (that means 'change display setup of e-mail reception') that is the usage-source standard pattern is already specified, and a pattern matching process is performed between the standard pattern and the voice data "MEIRU JYUSHIN JI NO" (that means 'of e-mail reception') for specifying the modifying part.

In FIG. 8(*b*), the part "MEIRU JYUSHIN JI NO" (that means 'of e-mail reception' is specified as the modifying part of the usage-source standard pattern (the modifying part is specified with two thick arrows).

In FIG. 8(*c*), a new standard pattern "HYOUJI SETTEI WO HENKOU SHIMASU" (that means 'change display setup') is generated by deleting "MEIRU JYUSHIN JI NO" (that means 'of e-mail reception') from "MEIRU JYUSHIN JI NO HYOUJI SETTEI WO HENKOU SHIMASU" (that means 'change display setup of e-mail reception') that is the usage-source standard pattern.

The new standard pattern is added to a group of standard patterns (that is, "MEIRU JYUSHIN JI NO HYOUJI SETTEI WO HENKOU SHIMASU" (that means 'change display setup of e-mail reception'), "MEIRU JYUSHIN JI NO OTO SETTEI WO HENKOU SHIMASU" (that means 'change automatic setup of e-mail reception') and "MEIRU JYUSHIN JI NO FURIWAKE SETTEI WO HENKOU SHIMASU" (that means 'change distribution setup of e-mail reception')) that are registered on the standard pattern database (reference numeral 24 of FIG. 1).

FIG. 8(d) illustrates an updated group of standard patterns.

Figure 9:
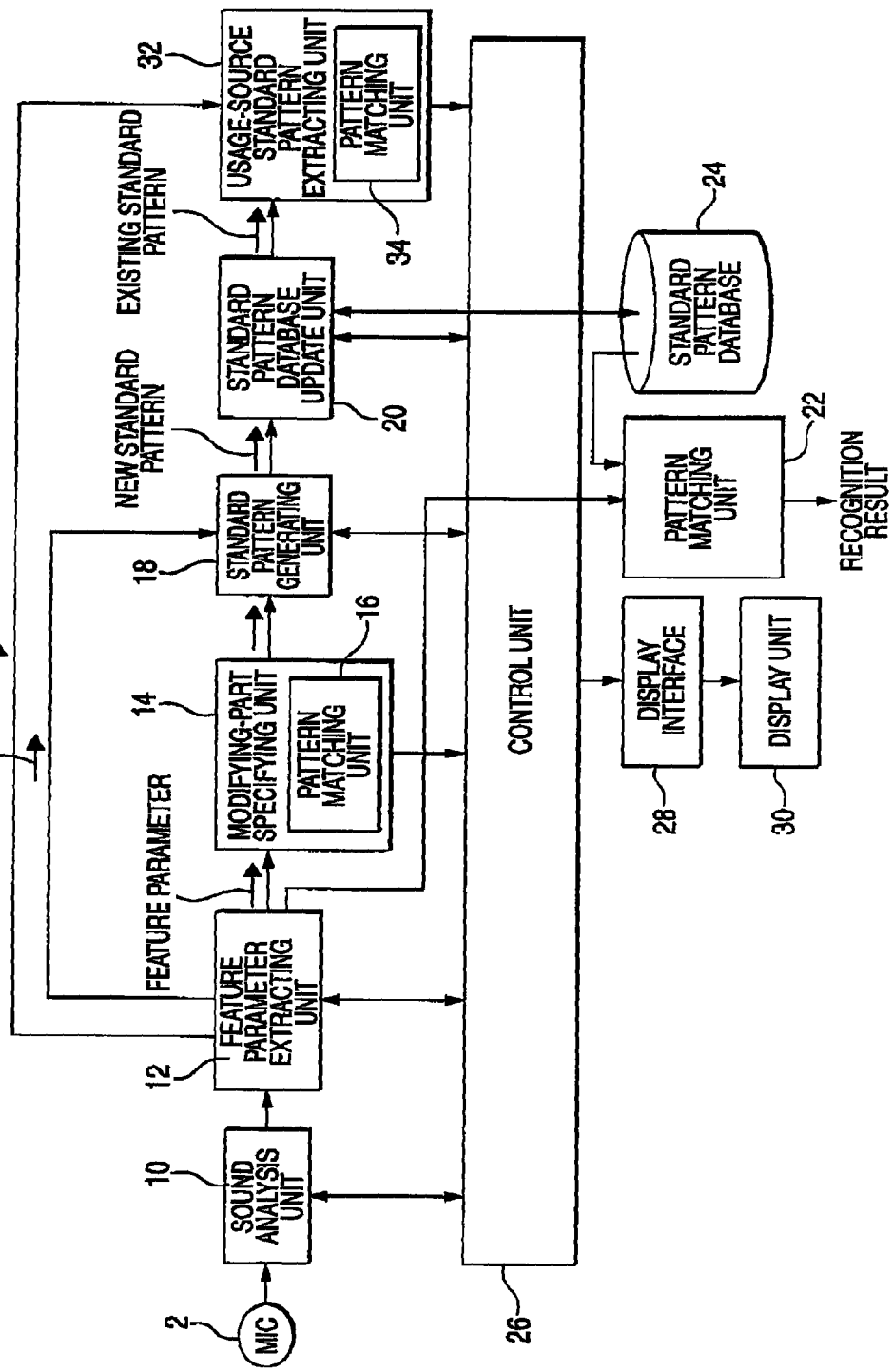
FIG. 9 is a block diagram of a voice recognition device (which performs control operation shown in FIGS. 7 and 8) according to an embodiment of the invention.

FIG. 9 is a block diagram of a voice recognition device (which performs control operation shown in FIGS. 7 and 8) according to an embodiment of the invention. Like reference numerals denote like elements in FIGS. 1, 5 and 9.

In FIG. 9, the voice recognition device excludes the recorded-voice accumulation unit 4 from the construction of FIG. 5 but further includes a usage-source standard pattern extracting unit 32 (which includes a pattern matching unit 34 and extracts existing standard patterns having a pattern matching with an input keyword as candidates of the usage-source standard patterns).

The pattern matching unit 34 of the usage-source standard pattern extracting unit 32 compares the feature parameter of the existing standard pattern sent from the standard pattern generating unit 20 with the feature parameter of keyword "MEIRU JYUSHIN" (that means 'e-mail reception') sent from the feature parameter extracting unit 12 to determine the degree of matching therebetween, and extracts existing standard patterns having a pattern matching with the input keyword as candidates of the usage-source standard patterns.

The operation of the voice recognition device shown in FIG. 9 is described above with reference to FIGS. 1 and 5.

Figure 10:
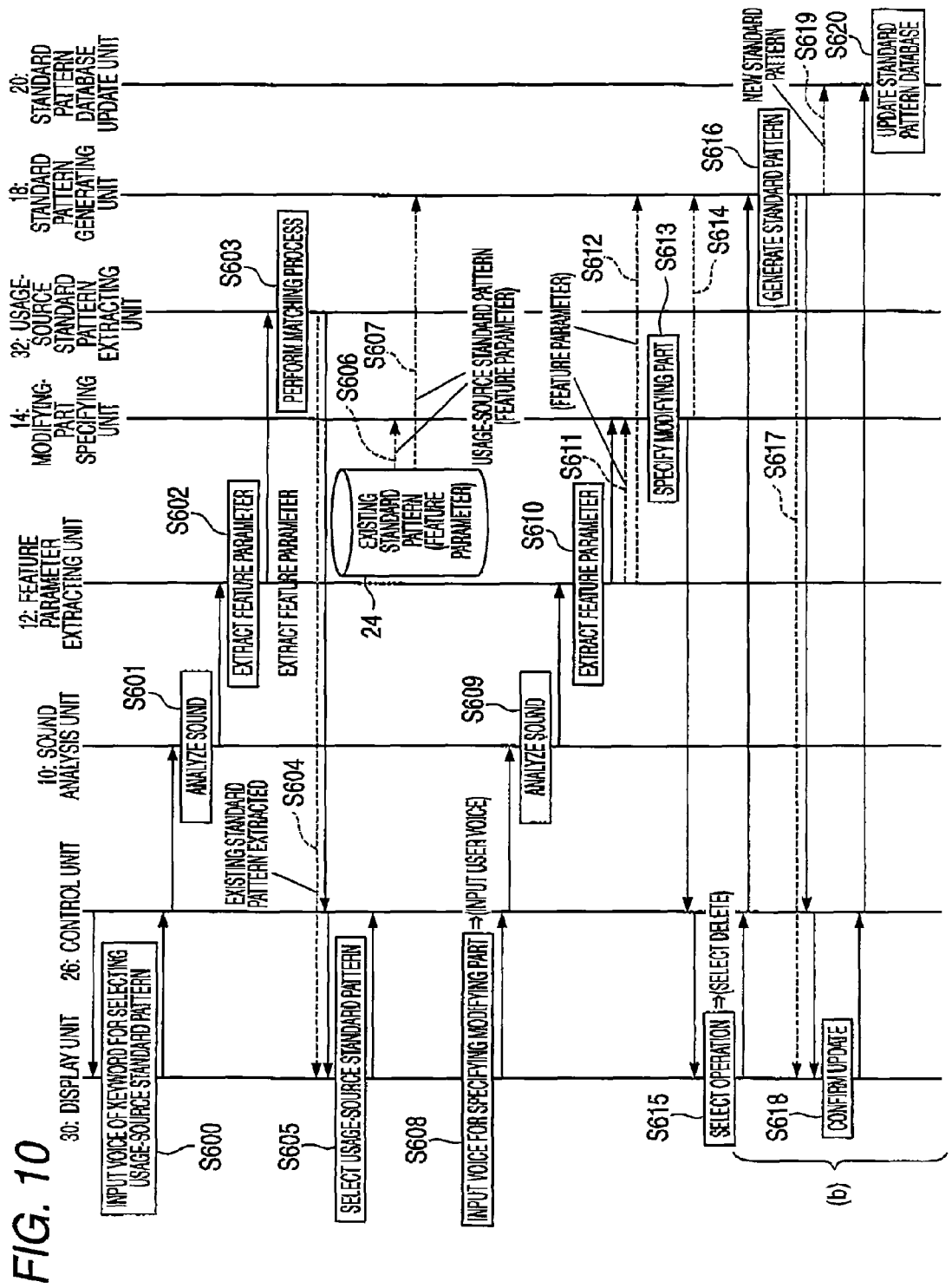
FIG. 10 is a sequence diagram showing the operation sequence of each of the elements of the voice recognition device shown in FIG. 9 and the sequence of data (signals) exchange.

FIG. 10 is a sequence diagram showing the operation sequence of each of elements of the voice recognition device shown in FIG. 9 and the sequence of data (signals) exchange.

The control unit 26 displays on the display unit 30 a screen prompting the user to input voice of a keyword for selecting usage-source voice, and the user inputs voice of the keyword "MEIRU JYUSHIN" (that means ('e-mail reception')) (step S600).

Next, sound analysis operation (step S601) and feature parameter extracting operation (step S602) are performed, and the matching process is performed between the feature parameter of the voice of the input keyword "MEIRU JYUSHIN" (that means ('e-mail reception')) and each of the feature parameters of the existing group of standard patterns (step S603) to extract standard patterns having, a matched part.

Next, information of the extracted standard patterns is sent to the display unit 30 (step S604), the information is displayed on the display unit 30, and the user selects a standard pattern "MEIRU JYUSHIN JI NO HYOUJI SETTEI WO HENKOU SHIMASU" (that means ('change display setup of e-mail reception')) that becomes the usage source (step S605), thereby specifying the usage-source standard pattern.

Next, the feature parameter of the standard pattern of the usage source that is stored in the standard pattern database 24 is sent to the modifying-part specifying unit 14 and the standard pattern generating unit 18 (steps S606 and S607).

Next, the user inputs voice for specifying the modifying part (that is, "MEIRU JYUSHIN JI NO" (that means 'of e-mail reception')) (step S608).

Next, the sound analysis operation is performed (step S609), the feature parameter extracting operation is performed (step S610), and the extracted feature parameter is sent to the modifying-part specifying unit 14 and the standard pattern generating unit 18 (steps S611 and S612).

The modifying-part specifying unit 14 specifies the modifying part through the pattern matching operation (step S613). A signal indicating the position of the modifying part is sent to the standard pattern generating unit 18 (step S614).

Next, the user selects a delete operation (step S615). Accordingly, "MEIRU JYUSHIN JI NO" (that means 'of reception' is deleted from the standard pattern "MEIRU JYUSHIN JI NO HYOUJI SETTEI WO HENKOU SHIMASU" (that means 'change display setup of reception' of the usage source, such that a new standard pattern "HYOUJI SETTEI WO HENKOU SHIMASU" (that means ('change display setup')) is generated (step S616).

Information of the new standard pattern is sent to the display unit 30 so that the user can confirm whether or not the new standard pattern is added to the standard pattern database 24 (S618).

When the user approves addition of the new standard pattern, the standard pattern database update unit 20 adds the new standard pattern to the standard pattern database 24, such that the standard pattern database (voice recognition dictionary file) is updated (step S620).

(Fourth Embodiment)

The fourth embodiment describes the structure and operation of a mobile terminal equipped with a voice recognition device according to the invention.

Figure 11:
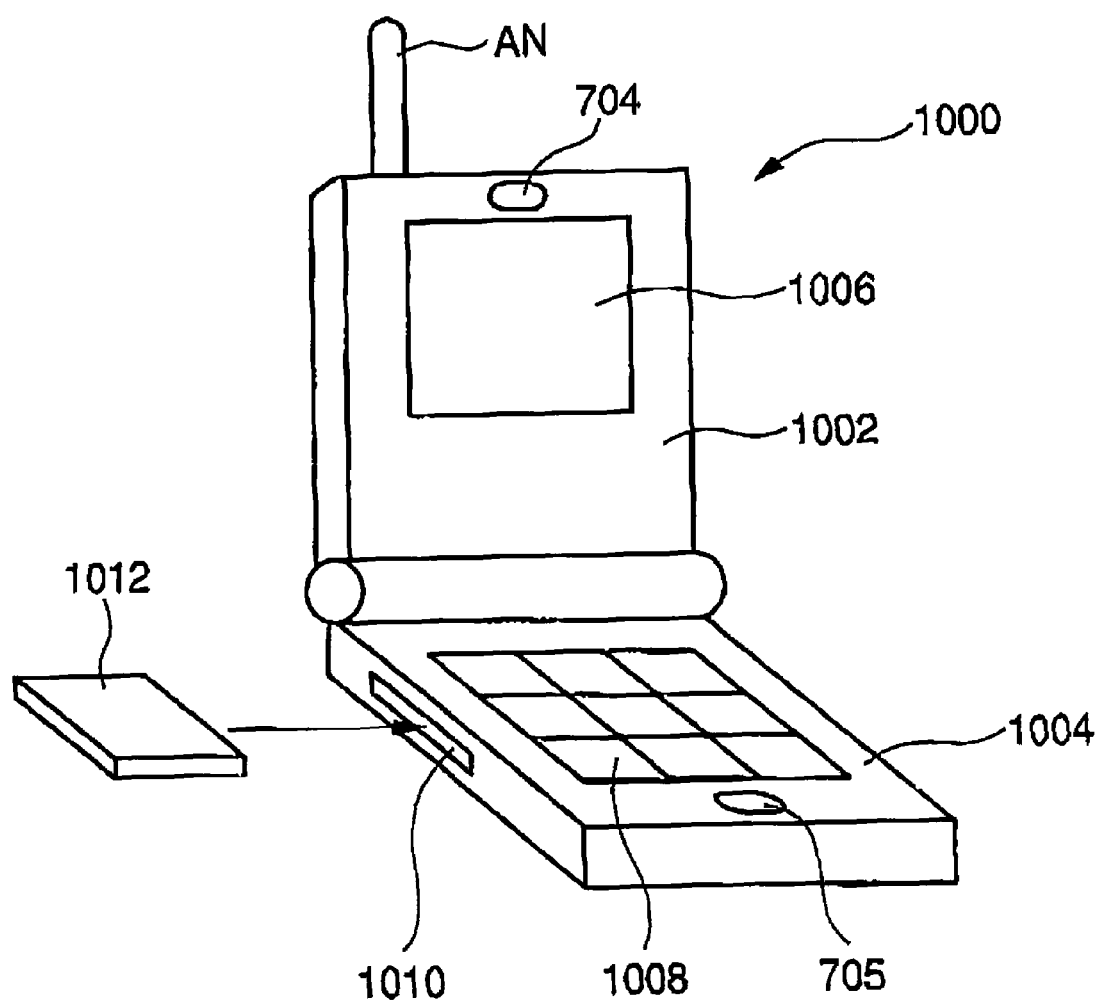
FIG. 11 is a-perspective view of the external structure of a mobile terminal equipped with a voice recognition device according to an embodiment of the invention.

FIG. 11 is a perspective view of the external structure of a mobile terminal equipped with a voice recognition device according to an embodiment of the invention.

The mobile terminal 1000 includes an antenna AN, an upper package 1002, a lower package 1004, a display unit 1006, an operation key 1008, an insertion hole 1010 for inserting a recording medium (recording media) 1012 storing standard patterns, a speaker 704, and a microphone 705.

Figure 12:
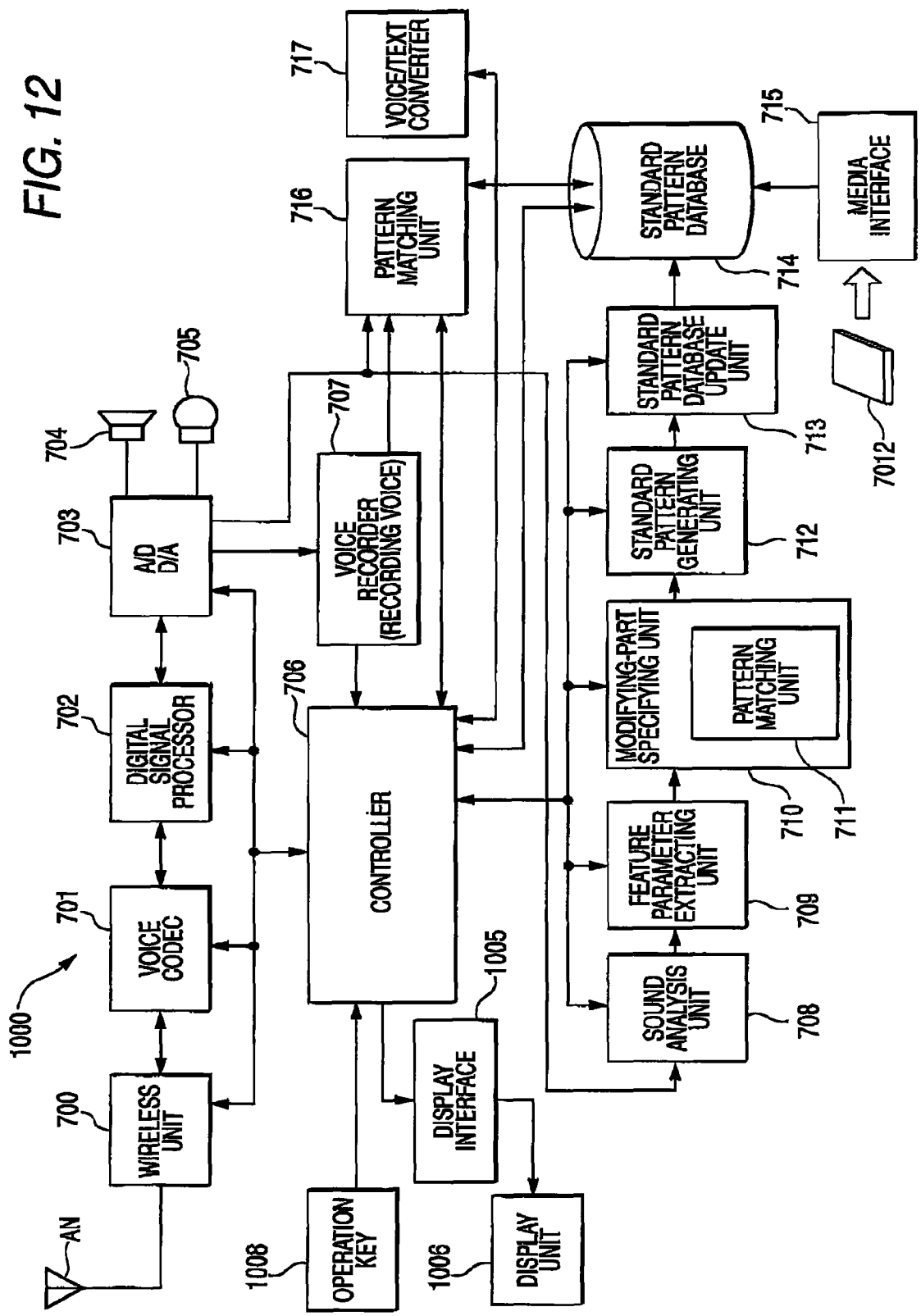
FIG. 12 is a block diagram of the internal structure of the mobile terminal shown in FIG. 11.

FIG. 12 is a block diagram of the internal structure of the mobile terminal shown in FIG. 11.

The mobile terminal 1000 includes an antenna AN, a wireless unit 700, a voice codec 701, a digital signal processor 702, an A/D converter and D/A converter 703, a speaker 704, a microphone 705, a controller 706, a voice recorder 707, a sound analysis unit 708, a feature parameter extracting unit 709, a modifying-part specifying unit 710 (including a pattern matching unit 711), a standard pattern generating unit 712, a standard pattern database update unit 713, a standard pattern database 714, a media interface 715 serving as a data interface with a recording media 1012 recording standard patterns, a pattern matching unit (which performs voice recognition of a voice recognition device and, if necessary, extracts candidates of standard patterns of a usage source) 716, and a voice/text converter 717.

The operation and setup of the mobile terminal thus configured can be controlled by voice.

In addition, the voice can be automatically converted to texts by the voice/text converter 717. Accordingly, it is easy to generate e-mail.

As described above, when the operation of the mobile terminal is controlled by voice, it is important to recognize various voices generated by substituting part of a typical voice pattern with other voices.

For instance, suppose that a mobile terminal is automatically turned off by recognizing broadcasted announcements in public areas, such as a cinema, a hospital, a station, and a building. The mobile terminal is first configured to recognize announcement in a cinema that announces 'please turn off your mobile terminal in the cinema' (that is, a standard pattern of words 'please turn off your mobile terminal in the cinema' is registered in a voice recognition dictionary of the mobile terminal in advance). Then, the part 'in the cinema' in the standard pattern can be substituted with voice data 'in the hospital', 'in the station' or 'in the building', such that the standard pattern can be efficiently used to turn off the mobile terminal in the various conditions.

In addition, when e-mails are written by inputting voice through voice/text conversion operation, it becomes important to recognize various voices generated by substituting part of a typical voice pattern with other voices.

The e-mails of the mobile terminal are frequently used to communicate with friends or other people. In particular, the e-mails are frequently used to change user's appointments, for example.

For instance, when a standard pattern 'Let's meet at Hachiko in Sibuya at 6 p.m. on Monday' is prepared, 'Monday' can be substituted with another day, '6 p.m.' with another time, or 'Hachiko in Sibuya' with another place. Accordingly, it is possible to efficiently generate standard patterns for voice recognition.

The method of modifying the part of existing standard pattern to add new standard patterns in the voice recognition device according to an embodiment of the invention is very efficient as a method of extending the recognition dictionary of the voice recognition device incorporated in the mobile terminal.

(Fifth Embodiment)

Although the above-mentioned embodiments describe the voice recognition device (voice edition device according to an embodiment of the invention that is used for voice recognition), the voice edition device may be used for different purposes. For example, the voice edition device can be used to process or edit voices.

For instance, it is assumed that a user records his/her voice data in his/her mobile terminal (for example, the voice data is prepared to be sent to his/her friends through e-mail). When part of the voice data is required to be modified for some reasons, it is not efficient to input the entire voice data again.

In this case, it is efficient to specify a modifying part through pattern matching and modify voice data of the modifying part to another voice data.

That is, the editing operation of voice data becomes simple by generating new voice data from the existing voice data, and automatically specifying a modifying part through the pattern matching process upon editing the voice data (that is, the voice recognition function of the voice recognition device is also used to edit the voice data). That is, it is possible to easily cut or combine voices by inserting a part of the voice to the existing voice.

For example, it is assumed that existing voice data "WATASHI WA NISEN GO NEN SHIGATSU NI EI SHA NI NYUSHA SHIMASHITA" (that means 'I entered the 'A' company on Apr. 1, 2005') is stored in the mobile terminal.

A method of editing the existing voice data is as follows. First, when a sentence 'please pronounce the part to be cut' is displayed on a display unit of the mobile terminal, a user pronounces "NISEN GO NEN SHIGATSU NI" (that means 'on Apr. 1, 2005.') The user's voice is input to the mobile terminal. Then, a pattern matching process is performed between the existing voice data and the new input voice, and a matched part is cut. As a result, the voice "WATASHI WA EI-SHA NI NYUSHA SHIMASHITA" (that means 'I entered the 'A' company') is obtained.

In addition, the invention can be used to divide the existing voice data into a plurality of sentences.

For example, it is assumed that the voice data "JUJI KARA KAIGI DESU BASHO WA DAIICHI KAIGI SHITSU DESU" (that means 'the meeting will take place at 10 o'clock in the first conference room' is stored in a mobile terminal. When a sentence 'please pronounce part of the voice to be divided' is displayed on a display unit of the mobile terminal, the user pronounces "BASHO WA" (that means 'in.' Then, the voice "BASHO WA" (that means) 'in' is input to the mobile terminal, and is compared with the existing voice data by performing pattern matching therebetween.

As a result, the existing voice data "JUJI KARA KAIGI DESU BASHO WA DAIICHI KAIGI SHITSU DESU" (that means 'the meeting will take place at 10 o'clock in the first conference room') is divided into two voice data, that is, "JUJI KARA KAIGI DESU" (that means 'the meeting will take place at 10 o'clock' and "BASHO WA DAIICHI KAIGI SHITSU DESU" (that means 'in the first conference room.')

The configuration for editing the voice data is the same as that of the above-mentioned embodiment. That is, it is possible to specify the modifying part of the existing voice data by matching process using the Mel-cepstrum data (since Mel-cepstrum is generated by analyzing the voice data in a predetermined section, it is possible to specify the modifying part with respect to voice).

In addition, based on information of the modifying part, it is possible to conveniently edit voice, that is, it is possible to conveniently cut voice, insert new voice, or combine the voice that is cut.

Therefore, according to the voice edition device according to an embodiment of the invention, it is possible to conveniently edit the voice data using the mobile terminal. As a result, it is possible to generate various voice data efficiently and inexpensively.

Since the voice edition device generates new voice data (including standard patterns as a voice recognition dictionary) by editing existing voice data, it is possible to easily edit the voice data by automatically specifying a modifying part using the pattern matching process, that is, by using the voice recognition function of the voice recognition device to edit the voice data.

That is, it is possible to simply edit the voice data, that is, it is possible to simply cut or combine the voice data, since the voice data is partially input to the existing voice.

Accordingly, according to the embodiment of the invention, it is possible to simply edit the voice data using the mobile terminal, such that various voice data can be generated efficiently and inexpensively. For example, when a part of the voice data stored in the mobile terminal is modified, it is possible to edit the voice data by specifying the modifying part and substituting it with another voice data.

In detail, it is possible to efficiently generate various standard patterns from the existing standard patterns by using the voice edition device, voice edition method, and voice edition program as the voice recognition device, standard pattern generating method, and standard pattern generating program.

In addition, it is possible to efficiently generate useful standard patterns by automatically specifying the modifying part through the pattern matching process, that is, by using the voice recognition function of the voice recognition device to generate the standard patterns. Accordingly, it is possible to easily and rapidly extend the amount of words that can be voice-recognized.

When the operation of the mobile terminal is controlled through voice recognition, or e-mail is efficiently generated by converting an input voice signal to text data, it is important to recognize the different voice part. Accordingly, the method of generating new standard patterns by modifying part of the existing standard pattern according to an embodiment of the invention is very efficient.

In addition, it is possible to simply specify a modifying part in the existing standard pattern through the pattern matching process. That is, since the matching process function of the voice recognition device is also used to generate the standard pattern in the invention, it is possible to reduce the number of hardware required. Accordingly, it is possible to reduce the cost.

As the update voice data for updating the exiting standard pattern, a voice input by the user, voice data obtained by cutting from the existing standard pattern, or voice data of the existing standard pattern itself may be used. Since various kinds of voice data are used, a new standard pattern creation process is made efficient.

In addition, since the voice edition device (including voice recognition device) can easily customize the voice data, which is compact and inexpensive, as such the voice edition device can be easily included with the electronic apparatus.

In addition, according to the voice edition method (including the standard pattern generating method) according to an embodiment of the invention, it is possible to efficiently extend new useful voice data (standard patterns) easily.

Furthermore, according to the voice edition program according to an embodiment of the invention, it is possible to edit the voice data (including standard patterns) conveniently and inexpensively.

It will be apparent to those skilled in the art that various modifications and variation can be made in the invention without departing from the spirit or scope of the invention. Thus, it is intended that the invention cover the modifications and variations of this invention provided they come within the scope of the appended claims and their equivalents.

This application claims the benefit of and priority to Japanese. Patent Application No. 2005-156205, filed on May 27, 2005, which is hereby incorporated by reference for all purposes as if fully set forth herein.

INDUSTRIAL APPLICABILITY

According to the invention, it is possible to conveniently edit voice data using a mobile terminal. In particular, when it is used as a voice recognition device, it is possible to easily and efficiently extend the amount of words that can be voice-recognized. Accordingly, for example, it is suitable to be used in a compact, inexpensive voice edition device (including voice recognition device) that is incorporated in electronic apparatuses or mobile terminals (mobile phone, PDA, etc.).

The invention claimed is:

1. A voice edition apparatus, of a mobile terminal, that uses existing voice data to generate another voice data, comprising:
a standard pattern database that is stored in the mobile terminal, the standard pattern database storing the existing voice data as a plurality of predefined standard patterns, each standard pattern representing a plurality of words in a sequence;
a modifying-part specifying unit that performs a matching process between usage-source voice data among the existing voice data and modifying-part voice data for specifying a modifying part of the usage-source voice data, and specifies at least a part of the usage-source voice data as the modifying part, wherein the usage-source voice data represents a plurality of words in a sequence; and
a voice data generating unit that uses the modifying-part voice data specified by the modifying-part specifying unit to generate another voice data as another standard pattern representing a new plurality of words in a sequence not present in the standard pattern database,
wherein a sequence of words within the usage-source voice data is identical to a sequence of words within the another standard pattern, the sequence of words within the usage-source voice data being a subset of said plurality of words in a sequence, and the sequence of words within the another standard pattern being a subset of said new plurality of words in a sequence not present in the standard pattern database, the another standard pattern including a further subset sequence of words that does not match the usage-source voice data,
wherein the standard pattern database is updated by storing the another voice data in the standard pattern database.

2. The voice edition apparatus of claim 1, wherein the voice data generating unit generates, as another voice data, voice data obtained by substituting the modifying-part voice data of the usage-source voice data specified by the modifying-part specifying unit with different voice data.

3. The voice edition apparatus of claim 2, wherein the different voice data used to generate another voice data comprises voice data that is input to the voice edition apparatus from the outside or voice data that is cut from the existing voice data.

4. The voice edition apparatus of claim 1, wherein the voice data generating unit generates, as another voice data, voice data obtained by combining the modifying-part voice data specified by the modifying-part specifying unit with different voice data.

5. The voice edition apparatus of claim 1, wherein the mobile terminal recognizes that a broadcast announcement matches one of the predefined standard patterns and, based thereon, activates a vibrator.

6. The voice edition apparatus of claim 1, wherein the mobile terminal recognizes that a broadcast announcement matches one of the predefined standard patterns and, based thereon, automatically turns itself off.

7. A voice recognition apparatus that uses one of the predefined standard patterns to generate the another standard pattern by means of the voice edition apparatus of claim 1,
wherein the modifying-part specifying unit performs a matching process between a usage-source standard pattern among the predefined standard patterns and modifying-part voice data for specifying a modifying-part of the usage-source standard pattern and specifies at least a part of the usage-source standard pattern as the modifying part; and
wherein the voice data generating unit uses the modifying-part specifying unit to generate the another standard pattern.

8. The voice recognition apparatus of claim 7, further comprising a standard pattern database update unit that updates the standard pattern database by substituting the another standard pattern generated by the voice data generating unit for the usage-source standard pattern, or by adding the another standard pattern as a standard pattern that is different from the usage-source standard pattern.

9. The voice recognition apparatus of claim 7, wherein the modifying-part specifying unit performs a matching process between the voice data for extracting the usage-source standard pattern and the voice data having a plurality of existing standard patterns, and extracts, as the usage-source standard pattern, the predefined standard pattern containing a matched part between the voice data for extracting the usage-source standard pattern and the voice data having a plurality of existing standard patterns.

10. A voice edition method that uses existing voice data to generate another voice data, the method comprising:
recording a sound using a microphone;
generating modifying-part voice data based on the sound;

providing a standard pattern database storing existing voice data as a plurality of predefined standard patterns, each standard pattern representing a plurality of words in a sequence;

performing a match process between usage-source voice data among the existing voice data and the modifying-part voice data for specifying a modifying part of the usage-source voice data and specifying at least a part of the usage-source voice data as the modifying part, using the specified modifying-part voice data to generate another voice data as another standard pattern representing a new plurality of words in a sequence not present in the standard pattern database, wherein a sequence of words within the usage-source voice data is identical to a sequence of words within the another standard pattern, the sequence of words within the usage-source voice data being a subset of a plurality of words in a sequence represented by the usage-source voice data, and the sequence of words within the another standard pattern being a subset of said new plurality of words in a sequence not present in the standard pattern database, the another standard pattern including a further subset sequence of words that does not match the usage-source voice data; and updating the standard pattern database by storing the another voice data in the standard pattern database.

11. The voice edition method of claim 10, further comprising the steps of:

recognizing, by a mobile terminal, that a broadcast announcement matches one of the predefined standard patterns; and activating a vibrator based on a result of the step of recognizing.

12. The voice edition method of claim 10, further comprising the steps of:

recognizing, by a mobile terminal, that a broadcast announcement matches one of the predefined standard patterns; and the mobile terminal automatically turning itself off based on a result of the step of recognizing.

13. A voice edition program product embodied on a non-transitory computer readable medium which, when executed by a computer, cause the computer to execute the voice edition method of claim 10.

14. A voice recognition method that uses a predefined standard pattern to generate another standard pattern, the method comprising:

recording a sound using a microphone;

generating modifying-part voice data based on the sound;

providing a standard pattern database storing a plurality of predefined standard patterns, each standard pattern representing a plurality of words in a sequence;

performing a matching process between a usage-source standard pattern among the predefined standard patterns and the modifying-part voice data for specifying a modifying part of the usage-source standard pattern and specifying at least a part of the usage-source standard pattern as the modifying part;

using the specified modifying-part voice data to generate another standard pattern representing a new plurality of words in a sequence not present in the standard pattern database, wherein a sequence of words within the usage-source standard pattern is identical to a sequence of words within the another standard pattern, the sequence of words within the usage-source standard pattern being a subset of a plurality of words in a sequence represented by the usage-source standard pattern, and the sequence of words within the another standard pattern being a subset of said new plurality of words in a sequence not present in the standard pattern database, the another standard pattern including a further subset sequence of words that does not match the usage-source standard pattern; and updating the standard pattern database by storing the another standard pattern in the standard pattern database.

15. The voice recognition method of claim 14, further comprising the steps of:

recognizing, by a mobile terminal, that a broadcast announcement matches one of the predefined standard patterns; and activating a vibrator based on a result of the step of recognizing.

16. The voice recognition method of claim 14, further comprising the steps of:

recognizing, by a mobile terminal, that a broadcast announcement matches one of the predefined standard patterns; and the mobile terminal automatically turning itself off based on a result of the step of recognizing.

17. A voice edition program product embodied on a non-transitory computer readable medium which, when executed by a computer, cause the computer to execute the voice recognition method of claim 14.

* * * * *